Aug. 21, 1923.
A. F. MILEY
THREAD GAUGE
Filed Dec. 9, 1919
1,465,583
2 Sheets—Sheet 1
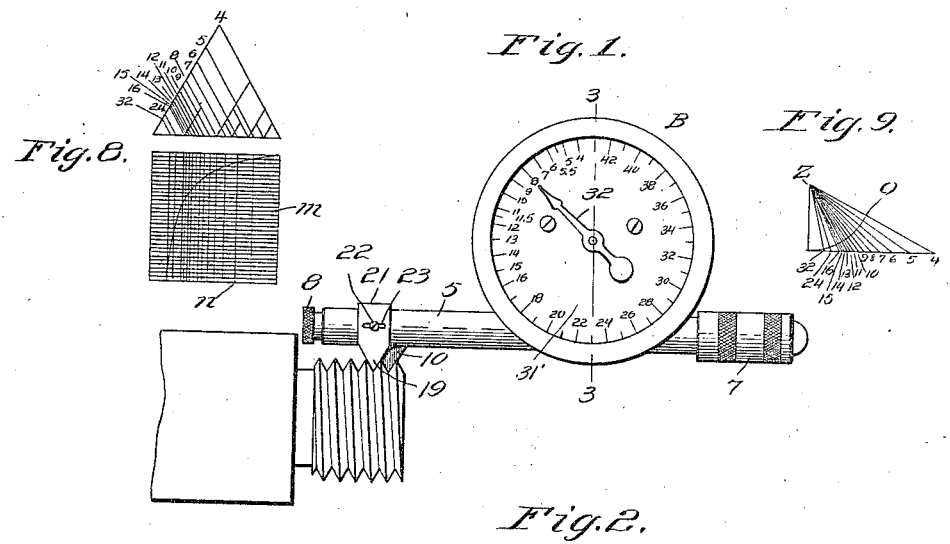
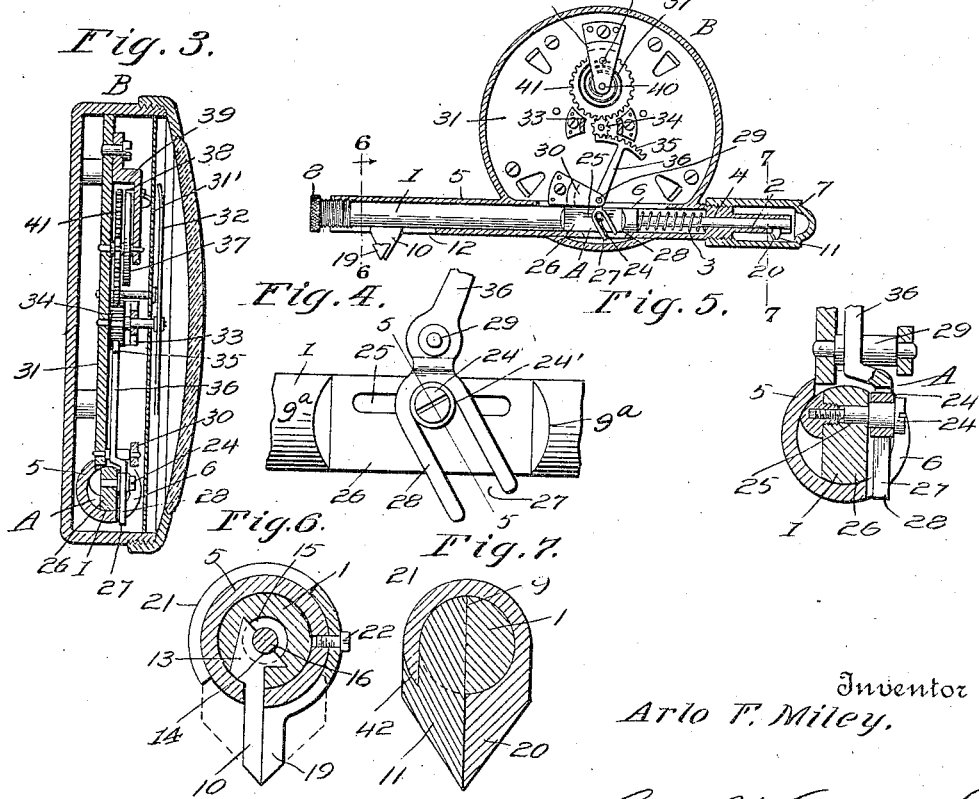
Inventor
Arlo F. Miley.
By Geo. P. Kimmel
Attorney Aug. 21, 1923.

A. F. MILEY 1,465,583

THREAD GAUGE

Filed Dec. 9, 1919      2 Sheets-Sheet 2

Inventor
Arlo F. Miley.

By Geo. F. Kimmel
Attorney

Patented Aug. 21, 1923.

1,465,583

UNITED STATES PATENT OFFICE.

ARLO F. MILEY, OF PONTIAC, MICHIGAN.

THREAD GAUGE.

Application filed December 9, 1919. Serial No. 343,523.

*To all whom it may concern:*

Be it known that I, ARLO F. MILEY, a citizen of the United States, residing at Pontiac, in the county of Oakland and State of Michigan, have invented certain new and useful Improvements in Thread Gauges, of which the following is a specification.

This invention relates to improvements in measuring instruments of the type primarily designed for gauging and testing the pitch or "lead" of screw threads.

Among the principal objects contemplated by the present invention are: to provide means for automatically gauging, testing and visibly indicating with absolute accuracy the pitch or "lead" of screw threaded parts of any type; to provide means for effecting necessary adjustments in the operating parts of the instrument; to automatically return the gauging and indicating elements of the instrument to zero upon the completion of a test; and to compensate for possible vibration or wavering of the indicator needle to effect quick and accurate tests.

Furthermore the invention provides means for automatically translating irregular movement of the thread engaging parts as resultant from application to screw threads of various pitches into uniform movement of a visible indicator operative upon a regular scale graduated in equal degrees about the periphery of a circular indicator dial in order to clearly and accurately acquaint the operator with the results of a test.

As couched in general terms the instrument accomplishes the above and other objects which will hereinafter appear as the description proceeds, through the medium of an adjustable actuating rod slidable within a casing and connected with a spring stabilized pointer movable over a circular uniformly graduated indicator dial. Measuring points adjustably mounted on both the casing and actuating rod are adapted each for engagement in the grooves between adjacent screw threads to move the actuating rod with respect to the casing to indirectly measure or gauge the distance between the axes of consecutive threads; compensating mechanism being provided in the connection between the actuating rod and pointer for translating the irregular movement of the rod into uniform movement of the pointer. These elements and other features are illustrated in detail in the accompanying drawings and hereinafter described and claimed.

Figure 1 is a side elevation of the assembly of the device in operation upon a screw threaded part.

Figure 2 is a sectional side elevation of the device without the interposition of a compensator.

Figure 3 is a section on the line 3—3 of Figure 1.

Figure 4 is a detail of the connection between the operating rod and indicator actuating mechanism.

Figure 5 is a section on the line 5—5 of Figure 4.

Figure 6 is a cross-section of the operating rod taken on the line 6—6 of Fig. 2.

Figure 7 is a cross section (slightly enlarged) taken on line 7—7 of Fig. 2.

Figure 8 is a graphic analysis of the dial face.

Figure 9 is a graphic analysis of the manner of translating longitudinal movement of the operating rod to a rotary indicator.

Figure 10:
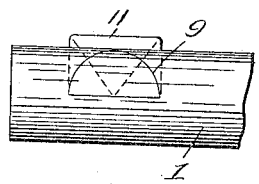
Figure 10 is a detail showing two associated small measuring points.

In the drawings wherein like characters of reference indicate like or similar parts throughout the several views, I have generally designated the operating mechanism by the letter A and the indicating mechanism by the letter B for the sake of differentiating between the two and for clarifying the description of the same.

The operating mechanism A of the instrument comprises an elongated cylindrical actuating rod 1 having a reduced terminal portion 2, a portion of which is embraced by a coil spring 3 whose ends abut the shoulder formed by the reduced portion 2 of the actuating rod and the shoulder formed by a reduced terminal portion 4 of a cylindrical elongated casing 5 within which the actuating rod is slidably mounted and normally forced toward one end thereof by the pressure of the spring 3. The casing 5 has an enlarged opening 6 midway its extremities over and about which is mounted in any suitable manner being made integral or otherwise the housing of the indicating mechanism B hereinafter referred to, and is provided with screw threads adjacent the reduced portion 4 for receiving a protecting cap 7. A set nut 8 screwed into the end of the casing opposite the reduced portion operates upon the end of the actuating rod 1 to adjust the normal position of the rod within the casing against the pressure of the coiled spring 3.

Figure 11:
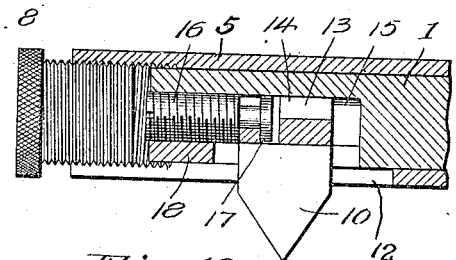
Figure 11 is a fragmentary detail of the operating rod adjusting mechanism and adjusting mechanism for one of the large measuring points.

The actuating rod 1 is provided with vertical dovetailed or arcuate grooves 9$^a$ adjacent each of its ends within which are adjustably mounted a large measuring point 10 and a relatively smaller measuring point 11, each of which extend through longitudinal slots 12 formed in the casing 5 as illustrated. In order that the measuring point 10 may be positively adjusted the shank 13 thereof may be formed triangularly as illustrated in Figure (6) and cut out to form a semi-cylindrical recess 14 registering with a semi-cylindrical longitudinal groove 15 in the end of the actuating rod 1 and a screw threaded adjusting pin 16 (Fig. 11) having a cylindrical head 17 operating in the groove 15 and engaging in the recess 14 is carried in a stem 18 mounted in the end of the rod 1 in the manner clearly illustrated, so that upon turning the pin 16 the measuring point 10 will be moved or adjusted to the degree desired. The relatively smaller measuring point 11 is not adjustable in the present embodiment of the invention, but may be made so if found desirable. Measuring points—19 and 20—(the latter of which is the smaller), coact with points 10 and 11 respectively and have curved clasping portions 21 which embrace the casing and the larger of which is secured thereto by a set screw 22 operating in a slot 23 provided in the curved portion 21 for permitting adjustment of the measuring point when desired. As shown in Figs. 6 and 7 the measuring points 19 and 20 on the casing extend downwardly to lie against the registering points 10 and 11 on the actuating rod 1, so that upon movement of either of the measuring points on the rod 1 relative to the measuring points on the casing 5 a corresponding movement will be effected of the rod with respect to the casing, and in order to translate this longitudinal movement to circular movement of the indicating mechanism a wrist pin generally designated by 24 is mounted transversely of the rod 1 in an elongated slot 25 formed in a reduced portion 26 midway the extremities thereof and is engaged between the bifurcations 27 of a lever 28 mounted on the end of a stub shaft 29 carried by the bracket 30 secured to the back of the plate 31 of the indicating mechanism B.

It has been found desirable to provide the wrist pin 24 with a suitable roller bearing 24' to eliminate frictional resistance and this bearing may be of any desired type. Furthermore attention is called to the fact that the wrist pin may be adjusted with respect to the rod 1 by moving it in the slot 25.

The indicating mechanism B, per se, includes a pointer 32 pivoted through a plate 31' and to the bracket 33 on the plate 31 and carrying a cog 34 which is engaged by an arcuate rack bar 35 mounted on an arm 36 pivoted to the pin 29 on the plate 31 so that upon swinging of the lever 28 resultant from movement of the rod 1 the cog 34 will be rotated and the pointer turned to indicate upon the graduated dial face the degree of movement of the rod. In order to prevent vibration of the pointer 32 and to steady the entire indicating mechanism a spring 37, one end of which engages a pin 38 carried by the bracket 39 secured to the face of the dial plate 31, has its other end secured to a shaft 40 which carries a gear 41 intergearing with the cog 34 as shown and operating in a manner which is obvious.

As illustrated in Figure 7 the measuring point 11 may be formed triangular in cross-section and provided with a socket 42 for receiving the terminal end of the curved clasping portion of the measuring point 20 which also is formed triangular in cross-section. In fact many modifications of the measuring points are possible and the present forms are shown merely by way of illustration.

In operation the rod 1 is adjusted with respect to the casing 5 by turning the set nut 8 so that the measuring points 10 and 19 will substantially register with each other, the points are then straddled over a thread to be gauged and pressed down to seat within the grooves on each side of the thread. See Fig. 1. As the points are moved apart by the intervening thread the actuating rod will be moved with respect to the casing and the pointer 32 will be rotated about the indicator dial to the graduation designating the pitch of the thread. It of course, is to be understood that the graduations will be spaced and numbered to conform to the sizes of standard threads indicated by the pointer. Upon releasing the measuring points from the thread the rod will be returned to its normal position through the pressure exerted by the coil spring 3 as is obvious. The small measuring points 11 and 20 are ordinarily enclosed and protected by the cap 7, but when very fine threads or those in a very small nut are to be measured the cap is removed and the instrument operated in the manner before stated. Attention is called to the fact that any variation between the actuating rod 1 and casing 5 may be adjusted by the set nut 8, between the measuring points by the set screw 22; and between the rod 1 and indicating mechanism by moving the wrist pin 24 in the slot 25. Furthermore attention is also invited to the function of the steadying spring 37 which prevents vibration and swinging of the pointer 32 and facilitates making quick and accurate tests.

As direct translation of the movement of the actuating rod to the indicator mechanism necessitates the utilization of ununiform graduations upon the indicator plate or dial 31', it has been found desirable to incorporate between the actuating mechanism and indicating mechanism a compensator for translating the irregular movement of the rod into uniform movement of the pointer, two forms of which are illustrated in Figures 12, 13, 14 and 15.

Figure 13:
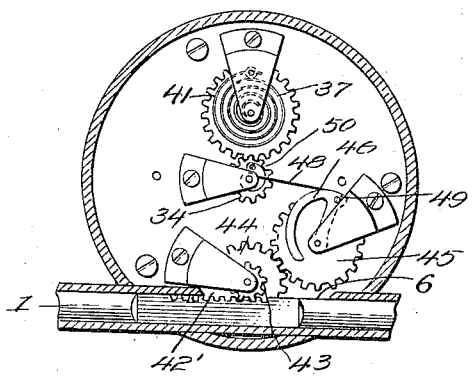
Figure 13 is a sectional side elevation of another form of compensation.
Figure 15:
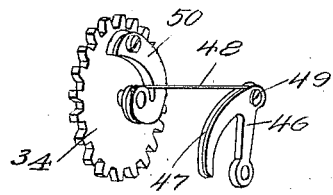
Figure 15 is a perspective detail of the semi-spiral compensator apparatus used in the modification illustrated in Figure 13.

The first form of compensator illustrated in Figures 13 and 15 embodies the formation of a rack 42' upon the actuating rod in lieu of the wrist pin and lever above referred to, and with which is intergeared the pinion 43 of a double gear type, the larger gear 44 of which is inter-geared with a gear wheel 45 carrying a semi-spiral arm 46 grooved to provide a track 47 for receiving a thread 48 secured thereto as at 49. The opposite end of the thread 48 is secured to and operates in a track in a similar, but reversed semi-spiral arm 50 carried by the cog 34 of the pointer, so that upon rearward movement of the acctuating rod 1 the semi-spiral arm 46 will be moved to wind the thread 48 in the track 47 and unwind it from the track in the semi-spiral arm 50 thus rotating the pointer, but compensating for the irregular movement of the rod, upon forward movement of the acctuating rod the opposite action of the thread will take place on account of the tension of the spring 37 as operating upon the cog 34 in the manner before described.

Figure 12:
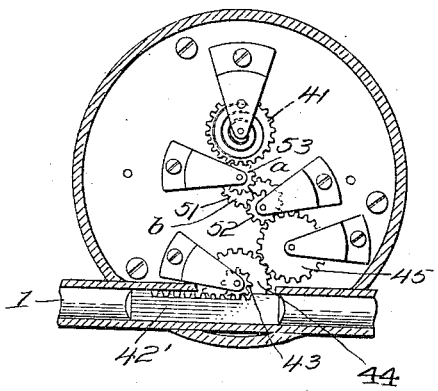
Figure 12 is a sectional side elevation of one form of compensation.
Figure 14:
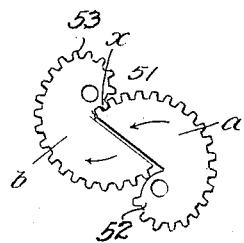
Figure 14 is a detail view of the bisected double segment cam gear compensator used in the modification illustrated in Figure 12.

The other form of compensator illustrated in Figures 12 and 14 embodies the disposition of a bisected double segment cam gear 51 having secured to each of its elements $a$ and $b$ cogs 52 and 53 respectively, intergearing with the gear wheel 45 and cog 34. In this instance upon rotation of the gear wheel 45 the element $a$ of the double segment gear 51 will be rotated by the cog 52 in the direction of the arrow and as its teeth mesh as at X with the element $b$ the gear 53 will be rotated to actuate the cog 34 and consequently the pointer 32, which however will have a regular movement over the dial on account of the compensating action of the cam gear 51.

The graphic analysis illustrated in Figures 8 and 9 indicates the manner in which irregular (uncompensated) graduations are ascertained for placement upon the dial face 31' to translate the movement of the rod 1. In the graphic illustrated in Figure 8 lines $m$ indicate thirty second graduations of an inch and lines $n$ the progress of the rod 1 upon application to screw threads of different standard sizes. In Figure 9 these graduations are shown as being translated to the circumference of a circle O (the periphery of a dial) having a center Z. The figures indicate standard sizes of threads ranging from 4 to 32.

It will now be apparent that I have devised a novel and useful construction of a thread gauge for screw threaded parts, which embodies the features of advantage enumerated as desirable in the statement of the invention and the above description, and while I have, in the present instance, shown and described preferred embodiments thereof which have been found in practice to give satisfactory and reliable results, it is to be understood that the same are susceptible of modification in various particulars without departing from the spirit or scope of the invention as claimed or sacrificing any of its advantages.

What I claim is:

1. A thread gauge comprising an indicator, a movable actuating member connected with the indicator, a casing for the actuating member, means respectively on the actuating member and casing for straddling a screw thread and moving the actuating member for ascertaining its pitch, and means located between and connected with the actuating member and the indicator for converting the irregular movement of the actuating member into a regular movement of the indicator.

2. A thread gauge comprising an indicator, a movable actuating member connected with the indicator, a casing for the actuating member, adjustable means respectively on the actuating member and casing for straddling a screw thread and moving the actuating member for ascertaining the pitch of said thread, means for translating the movement of the actuating member to the indicator and converting it from irregular to regular movement, and means for returning the actuating member to initial position after the test has been completed.

3. A thread gauge comprising an indicator, a movable actuating member for the indicator, a casing for the actuating member, means respectively on the actuating member and casing for straddling a screw thread and moving the actuating member for ascertaining the pitch of the screw thread, means between the actuating member and the indicator for translating the movement of the actuating member to the indicator and converting it from irregular to regular movement, and means for preventing vibration of the indicator.

4. A thread gauge comprising an indicator, a movable actuating rod, a casing for the actuating rod, means respectively on the actuating rod and casing for straddling a screw thread and moving the actuating rod with respect to the casing for ascertaining the pitch of the screw thread, adjustable means connecting the actuating rod with the indicator and including means interposed between said rod and indicator for translating irregular movement of the actuating rod into uniform movement of the indicator, and a spring connected with the indicator for preventing vibration of the latter.

5. A thread gauge comprising an indicator, a casing on the indicator, an actuating rod slidably mounted in the casing, pairs of measuring points one of each pair being located on the casing and actuating rod respectively for straddling screw threads and moving the actuating rod with respect to the casing, one pair of points being larger than the other, means for protecting the smaller measuring points when not in use, a coil spring embracing a portion of the actuating rod and abutting the casing for returning the actuating rod to its zero position, means for adjusting the actuating rod with respect to the casing, and means connected to the actuating rod and to the indicator for translating the longitudinal movement of the actuating rod into circular movement of the indicator.

6. A thread gauge comprising a dial plate, a pointer pivotally mounted to rotate over the dial plate, reciprocatory means for actuating the pointer, a spring operative with the actuating means for steadying the pointer, pitch determining means for straddling a screw thread and operatively connected with the actuating means for the pointer, means for translating and converting the reciprocatory movement of the straddling means into rotary movement with the pointer, means whereby the means for straddling a screw thread may be adjusted, and means for returning the screw thread straddling means to zero position after being removed from the screw thread.

7. A thread gauge comprising an indicator, a tubular casing having an opening in one side wall above which said indicator is mounted, a rod slidable longitudinally in said casing, a coiled spring mounted to hold said rod at zero position in the casing, a set nut mounted in one end of said casing to engage said rod and project it against the tension of said spring, pitch determining means for straddling a screw thread and mounted respectfully on the casing and on said rod, and means located between and connected with said rod and indicator whereby the movement of the rod is translated to the indicator and the latter caused to move uniformly.

In testimony whereof, I affix my signature hereto.

ARLO F. MILEY.